Figure 1:
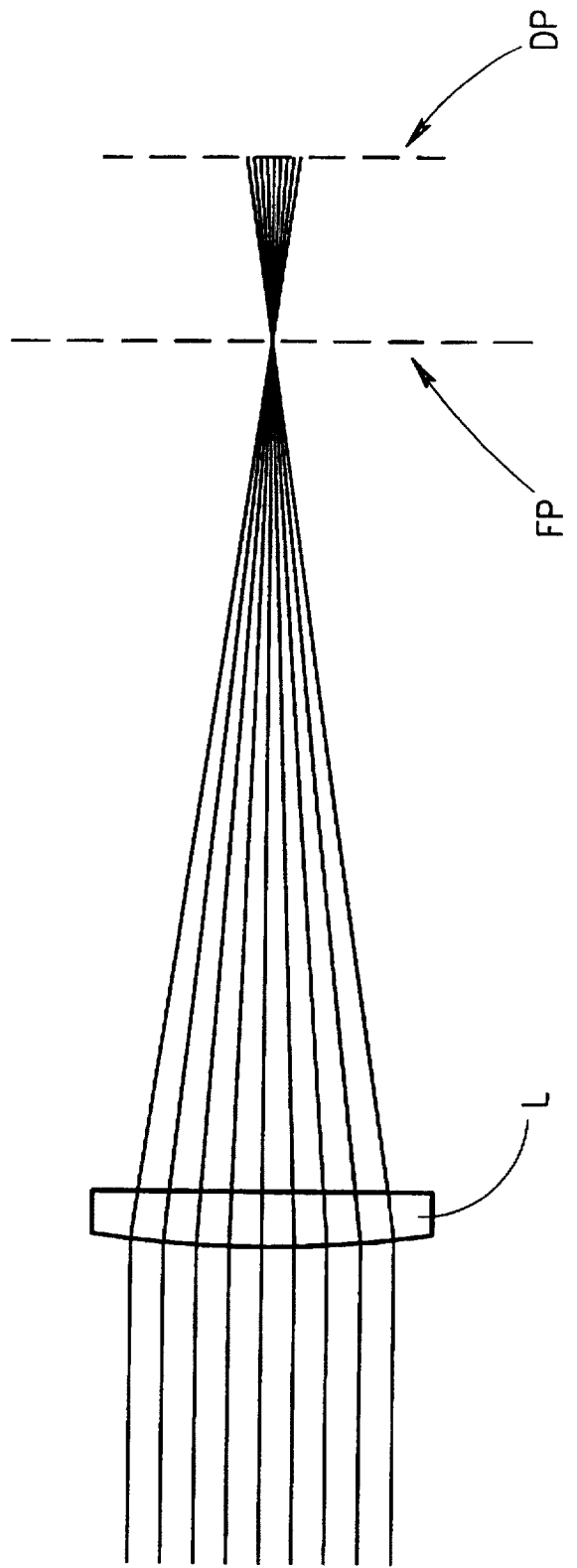

United States Patent [19]

Abraham

[11] Patent Number: 5,783,798
[45] Date of Patent: Jul. 21, 1998

[54] LASER BEAM DELIVERY METHOD AND SYSTEM

[75] Inventor: Martin Abraham, Hod Hasharon, Israel

[73] Assignee: Laser Industries Ltd., Tel Aviv, Israel

[21] Appl. No.: 574,551

[22] Filed: Dec. 19, 1995

[30] Foreign Application Priority Data

Dec. 21, 1994 [IL] Israel .................................. 112108

[51] Int. Cl.$^6$ .................................. B23K 26/00
[52] U.S. Cl. .................. 219/121.73; 219/121.76; 606/13
[58] Field of Search .............. 219/121.73, 121.75, 219/121, 76, 121.74; 606/4, 9, 10, 13, 14; 359/690, 694

[56] References Cited

U.S. PATENT DOCUMENTS

| | | | |
|---|---|---|---|
| 4,312,572 | 1/1982 | Yamashita et al. | 359/690 |
| 4,353,617 | 10/1982 | Tokumitsu | 359/694 |
| 4,597,380 | 7/1986 | Raif et al. | 606/14 |
| 5,313,042 | 5/1994 | Matsuyama et al. | 219/121.74 |
| 5,449,879 | 9/1995 | Lawson et al. | 219/121.74 |
| 5,475,197 | 12/1995 | Wrobel et al | 219/121.75 |
| 5,558,666 | 9/1996 | Dewey et al. | 606/13 |

FOREIGN PATENT DOCUMENTS

WO 95/19147  7/1995  WIPO .

*Primary Examiner*—Geoffrey S. Evans
*Attorney, Agent, or Firm*—Ladas & Parry

[57] ABSTRACT

A method of delivering a laser beam from a laser to a working site, comprising applying the laser beam received from the laser to a first positive optical element which converges the laser beam; applying the laser beam received from the first positive optical element to a negative optical element which diverges the laser beam; applying the laser beam received from the negative optical element to a second positive optical element which substantially collimates the laser beam before being applied to the working site; and varying the distance between the negative optical element and the second positive optical element to thereby vary the diameter of the substantially collimated laser beam applied to the working site.

13 Claims, 7 Drawing Sheets

LASER BEAM DELIVERY METHOD AND SYSTEM

The present invention relates to a method and system for delivering a laser beam or beams to a working site. The invention is particularly applicable in dermatology, and is therefore described below with respect to this application, but it will be appreciated that the invention could be used not only in many other medical applications, but also in non-medical applications requiring selective heating by laser radiation.

In dermatology, certain affects such as wrinkle smoothing, or lesion removal, may be achieved by using laser radiation to ablate tissue. For this purpose it is necessary to vary the energy density of the laser radiation applied to the tissue. The energy density may be varied by operating the laser system in a "pulsed" mode such that laser energy impinges upon the tissue for only part of the time the laser is directed at the tissue. This allows the irradiated tissue to cool between pulses, and therefore ablates tissue while minimizing thermal damage and charring.

Recently, $CO_2$ laser technology has been developed that allows very high pulse energies in rapid succession. Each pulse may have sufficient energy to ablate tissue without causing any charring. However, the energy density may be so large as to make holes in the tissue, or ablate more tissue than desired. In order to alleviate this problem, the size of the spot impinging upon the tissue may be increased, thus decreasing the energy density to more appropriate levels. Spot diameters of up to 3 mm are commonly used such that char-free ablation is still achieved. An added benefit of such a large spot size is the increased surface area that is ablated, thus allowing the surgeon to complete the treatment in a shorter amount of time.

The radiant energy produced by a $CO_2$ laser has a wavelength of 10.6 microns, and as such is invisible to the naked eye. For this reason, most $CO_2$ medical laser systems incorporate a visible light aiming beam, coaxial with the $CO_2$ working beam. This aiming beam is typically produced by a He—Ne laser, whose wavelength is 633 nanometers. Any optical system that is required to focus both wavelengths at the same point must have very low dispersion in order to minimize the chromatic aberration that would appear when working with these different wavelengths and with the refracting materials commonly available.

One way to achieve a large spot size is to incorporate a positive converging lens in a handpiece and operate beyond the focal plane. With this method, the focused spot size can be as small as 0.1 mm, but the size of the defocused spot beyond the focal plane can be as large as 3 mm. A main disadvantage of this method, however, is its sensitivity to the precise position of the laser beam with respect to the working site. Thus movement of only a few millimeters will cause the spot size to vary from its maximum to its minimum. The spot size on the tissue will therefore be extremely sensitive to both the stability of the surgeon's hand and the contours of the tissue.

One solution to this problem is to build a handpiece that collimates the beam emitted from the laser system. The spot size is therefore constant and not sensitive to surgeon hand movement or tissue contours. One manufacturer has recently developed a handpiece that collimates the laser beam. However, this handpiece provides only one beam diameter. If a different beam diameter is desired, the surgeon must switch to a different handpiece.

An object of the present invention is to provide a method and system for delivering a laser beam to a working site having advantages in the above respects.

The method and system of the present invention are particularly applicable for use in medical lasers to ablate tissue, such as in the field of dermatology, and the invention is therefore described below with respect to such an application.

According to one aspect of the present invention, there is provided a method of delivering a laser beam from a laser to a working site, comprising applying the laser beam received from the laser to a first positive optical element which converges the laser beam; applying the laser beam received from the first positive optical element to a negative optical element which diverges the laser beam; applying the laser beam received from the negative optical element to a second positive optical element which substantially collimates the laser beam before being applied to the working site; and varying the distance between the negative optical element and the second positive optical element to thereby vary the diameter of the substantially collimated laser beam applied to the working site.

According to further features in the described preferred embodiment, the distance is varied to vary the output beam diameter by moving the negative optical element relative to the second positive optical element.

Three embodiments of the invention are described below for purposes of example. In one described embodiment, the first positive optical element is a refractive lens assembly; in the second described embodiment, it is a lens-grating assembly; and in the third described embodiment, it is a mirror assembly. In all the described embodiments, the negative optical element and the second positive optical element are optical lenses.

As will be described more particularly below, the invention is particularly useful when embodied in a handheld handpiece for a $CO_2$ medical laser which collimates and varies the diameter of the laser beam emitted from the handpiece. Such a handpiece allows the surgeon to precisely control the laser beam spot size for the specific application, while allowing freedom to alter the spot size should this be desired during the procedure. As indicated earlier, a particularly useful application of the invention is in dermatology, e.g. for wrinkle smoothing or lesion removal, but the invention could advantageously be used in many other medical applications as well as in non-medical applications.

Further features and advantages of the invention will be apparent from the description below.

Figure 2:
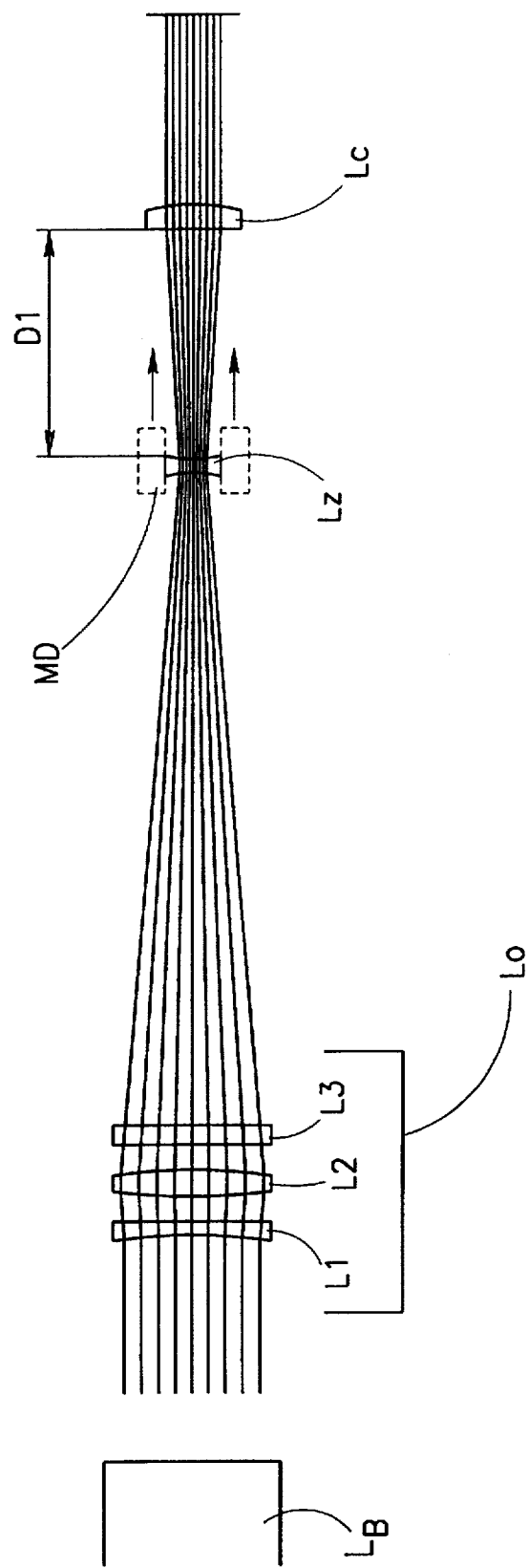
Figure 3:
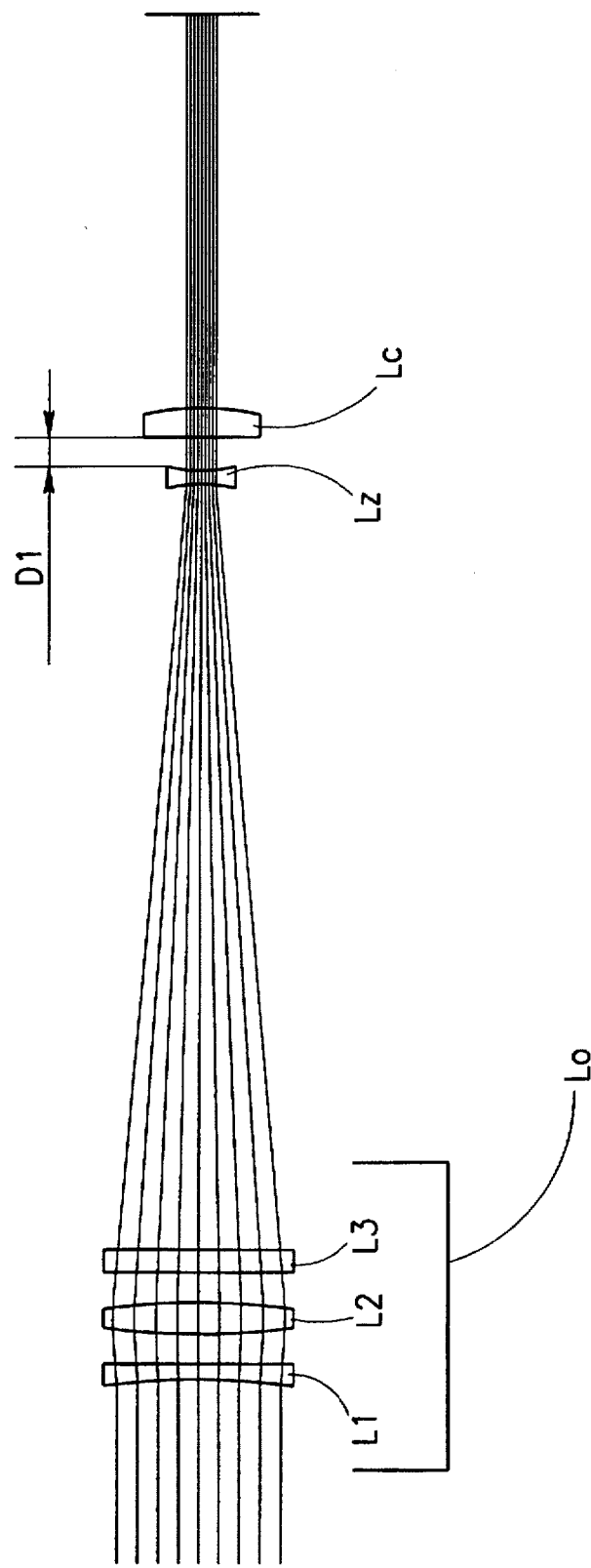
Figure 4:
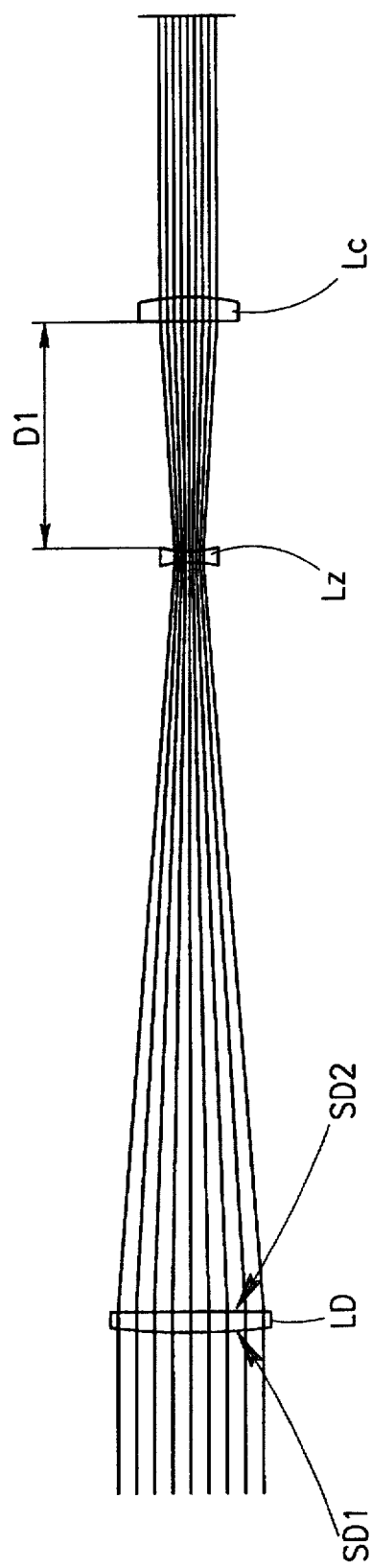
Figure 5:
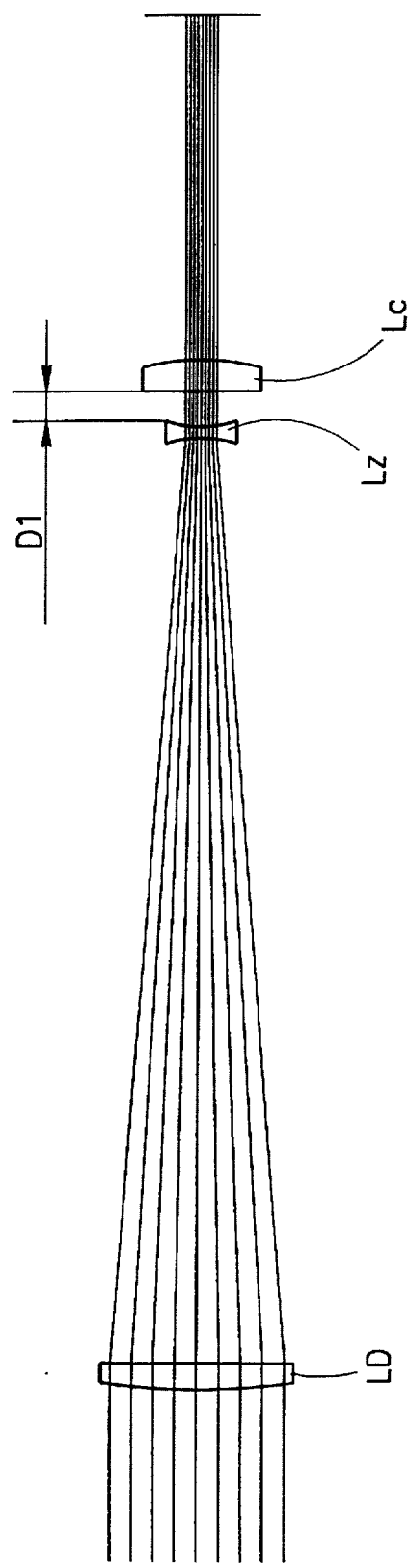
Figure 6:
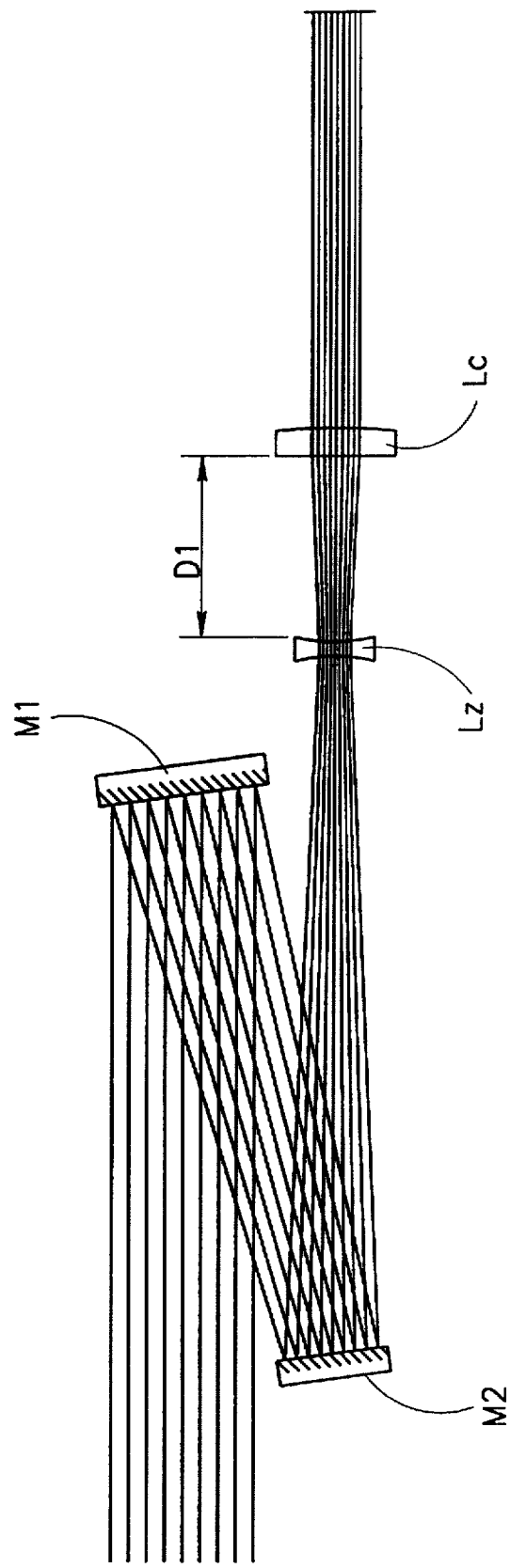
Figure 7:
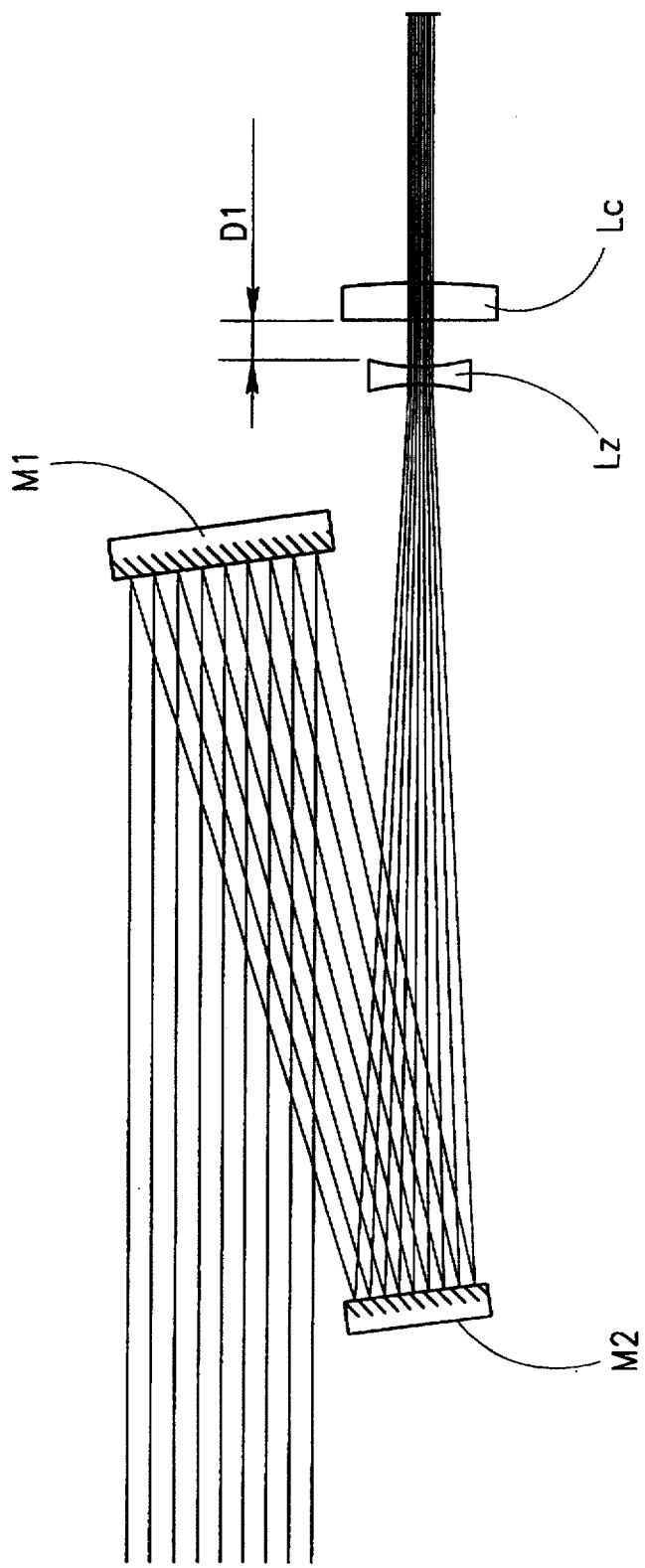

The invention is herein described, by way of example only, with reference to the accompanying drawings, wherein:

FIG. 1 diagrammatically illustrates the typical prior art "defocusing" technique for controlling the energy density of laser radiation applied to a surface;

FIG. 2 diagrammatically illustrates one form of apparatus for delivering laser radiation in accordance with the present invention, the diagram in FIG. 2 illustrating the apparatus in one condition;

FIG. 3 diagrammatically illustrates the apparatus of FIG. 2 in a second condition;

FIGS. 4 and 5 illustrate two conditions of a second form of apparatus for delivering laser radiation in accordance with the present invention; and FIGS. 6 and 7 illustrate two conditions of a third form of apparatus for delivering laser radiation in accordance with the present invention.

FIG. 1 illustrates the prior art "defocusing" technique for varying the energy density of laser radiation applied to a surface at the working site, indicated by plane DP in FIG. 1. As indicated earlier, this "defocusing" technique is highly sensitive to the location of the laser with respect to the working plane DP. For example, if the positive lens L has a focal length typically of 50 mm, at the focal plane FP the spot diameter will be typically 0.1 mm; but just 10 mm beyond the focal plane, at plane DP, the spot diameter is 3 mm. Accordingly, the spot size, and thereby the density of the laser radiation, are extremely sensitive to both the stability of the surgeon's hand and also to the contours of the tissue receiving the radiation.

FIGS. 2-7 illustrate three systems for varying the energy density of laser radiation in accordance with the present invention. Each of the three systems illustrated may be incorporated in a handpiece that collimates the laser beam by way of a zoom-type system. The handpiece can produce a collimated beam of varying diameter thus allowing the surgeon to work with different spot sizes without having to switch handpieces. To achieve different beam diameters, an afocal optical beam reduction system is used. The handpiece has a reduction ratio that can be continuously varied between two predetermined extreme values while preserving the collimated nature of the beam. The spot diameter is determined by the expansion ratio of the system multiplied by the incoming laser beam diameter.

All three systems include the following parts:

(a) a positive optical element that converges the incoming laser beam;

(b) a negative optical element that determines the final diameter of the outgoing laser beam, and (c) a second positive optical element that substantially collimates the outgoing laser beam.

In all three systems, the distance between the negative optical element and the second positive optical element is varied to thereby vary the diameter of the substantially collimated light beam applied at the working plane. In all three systems, the negative optical element and the second positive optical element are lenses. However, the first positive optical element is a refractive lens assembly in the system of FIGS. 2,3, a lens-grating assembly in the system of FIGS. 4,5, and a mirror assembly in the system of FIGS. 6,7.

In the three systems described below, the laser beam to be delivered, generally designated $L_B$ in FIG. 2, actually represents two laser beams to be delivered to the working site, namely a visible aiming beam supplied from a He—Ne laser, and an invisible working beam supplied from a $CO_2$ laser. The He—Ne laser is first energized to apply its visible aiming beam to the illustrated optical system; and when the surgeon sees that the laser is properly aimed, the $CO_2$ laser is energized to apply the working beam.

The system illustrated in FIGS. 2 and 3 is an "all lens" system since the positive optical element receiving and converting the incoming laser beam is an objective lens assembly generally designated $L_O$ in FIGS. 2 and 3.

In this system, $L_1$ is a negative lens made from Zinc Selenide (ZnSe) and $L_2$ is a positive lens made from Potassium Bromide (KBr). Element $L_3$ is a plane parallel window made from ZnSe. The three elements are sealed in an air proof chamber. The outer elements $L_1$ and $L_3$ provide a moisture-proof environment for the KBr element, which is highly hygroscopic. Lens $L_O$ has an aperture large enough to encompass the incoming $CO_2$/He—Ne laser beams, and is designed in such a way as to minimize dispersion that occurs when converging the $CO_2$ and He—Ne beams.

The negative optical element, a negative lens $L_Z$ also made of ZnSe, serves to increase the beam diameter. The second positive optical element, positive lens $L_C$ also made of ZnSe, substantially collimates the final beam.

Comparing FIG. 2 with FIG. 3, it can be seen that the change in distance $D_1$ between negative lens $L_Z$ and positive lens $L_C$ affects the desired change in the outgoing beam diameter. In a typical zoom system, it would have been necessary to move lens $L_C$ slightly with the larger movement of lens $L_Z$ in order to retain perfect collimation. In the present application, however, lens $L_C$ is not moved at all. This causes the outgoing beam, at minimum spot size, to diverge slightly from perfect collimation though still within the defined engineering tolerances. This greatly simplifies the design.

The negative lens $L_Z$ can be moved by the surgeon by way of a simple device on the handpiece as shown schematically by manipulatable device MD in FIG. 2.

FIG. 2 shows the handpiece at maximum spot size, when the negative lens $L_Z$ is farthest from the collimating lens $L_C$; FIG. 3 shows the handpiece at minimal spot size, when the negative lens $L_Z$ is closest to the collimating lens $L_C$. A typical minimal spot size is 1 mm, while a typical maximum spot size is 3 mm.

FIGS. 4 and 5 illustrate a system in which the positive optical element receiving and converging the incoming laser beam is a lens-grating assembly which incorporates a combination lens and diffractive component. This assembly consists of lens $L_D$, made of ZnSe, with a spherical convex surface on side $S_{D1}$ of the lens, and a diffraction grating etched on its opposite side $S_{D2}$. Lens assembly $L_D$ provides a focal length for the $CO_2$ beam identical to that for the He—Ne beam. This type of diffractive element, as well known in the art, corrects the dispersion for the He—Ne beam yet does not affect the $CO_2$ beam because of its much longer wavelength. Thus, this lens assembly removes the dispersion that will occur when converging the $CO_2$ and He—Ne beams.

Lens assembly $L_D$ has an aperture large enough to encompass the incoming $CO_2$/He—Ne laser beams.

As in FIGS. 2,3, the second optical element in the system of FIGS. 4,5, negative lens $L_Z$ also made of ZnSe, serves to increase the beam diameter; and the third optical element, positive lens $L_C$ also made of ZnSe, collimates the final beam.

Comparing FIG. 4 with FIG. 5, showing the handpiece at maximal and minimal spot size, respectively, it can be seen that the change in distance $D_1$ between negative lens $L_Z$ and positive lens $L_C$ effects the desired change in the outgoing beam diameter. As in the case of the system of FIGS. 2,3, in a typical zoom system it would have been necessary to move lens $L_C$ slightly with larger movement in order to retain perfect collimation. In the present application, however, lens $L_C$ is not moved at all, thus causing the outgoing beam to diverge slightly from perfect collimation, though still within the defined engineering tolerances. This greatly simplifies the design.

As in FIGS. 2,3, the negative lens $L_Z$ can be moved by the surgeon by way of a simple manipulatable device on the handpiece.

FIGS. 6,7 illustrate a system wherein a lens-mirror assembly replaces the first refractive element with a reflective element (whose dispersion is by nature non-existent), of similar aperture and focal length. The positive optical element receiving the incoming laser beam is comprised of two mirrors, $M_1$ and $M_2$ that operate off-axis, and serve to converge the incoming laser beam. Mirror $M_1$ is concave and $M_2$ is flat. The flat mirror $M_2$ serves as a folding mirror to make the design more compact. The second element, a negative lens $L_Z$ made of ZnSe, serves to increase the beam diameter; whereas the third element, positive lens $L_C$ also made of ZnSe, collimates the final beam.

Comparing FIG. 6 with FIG. 7, it can be seen that the change in distance $D_1$ between negative lens $L_Z$ and positive lens $L_C$ affects the desired change in the outgoing beam diameter. As described previously, in a typical zoom system it would be necessary to move $L_C$ slightly with $L_Z$'s larger movement in order to retain perfect collimation. In the present application, however, $L_C$ is not moved at all, thus causing the outgoing beam to diverge slightly from perfect collimation, though still within the defined engineering tolerances. This greatly simplifies the design.

As also described earlier, the negative lens $L_Z$ can be moved by the surgeon by way of a simple device on the handpiece. As with the other embodiments FIGS. 6 and 7 show the handpiece at maximal and minimal spot size, respectively.

While the invention has been described with respect to three illustrative embodiments, it will be appreciated that these are set forth merely for purposes of example, and that many other variations, modifications and other applications of the invention may be made.

I claim:

1. A method of delivering a laser beam from a laser to a working site, comprising:

applying the laser beam received from the laser to a first positive optical element which converges the laser beam;

applying the laser beam received from said first positive optical element to a negative optical element which diverges the laser beam;

applying the laser beam received from the negative optical element to a second positive optical element which substantially collimates the laser beam before being applied to the working site;

and varying the distance between said negative optical element and said second positive optical element to thereby vary the diameter of the substantially collimated laser beam applied to the working site;

and wherein said first positive optical element is a lens-grating assembly.

2. The method according to claim 1, wherein said distance is varied to vary the output beam diameter by moving the negative optical element relative to said second positive optical element.

3. The method according to claim 1, wherein said negative optical element and said second positive optical element are optical lenses.

4. The method according to claim 1, wherein two beams are delivered, one being an invisible working beam, and the other being a visible aiming beam.

5. The method according to claim 4, wherein said invisible working beam is from a $CO_2$ laser, and said visible aiming beam is from an He—Ne laser.

6. A laser beam delivery system for delivering a laser beam to a working site, comprising:

a laser outputting laser beam;

a first positive optical element located and constructed to receive and converge said laser beam from the laser;

a negative optical element located and constructed to receive the laser beam from said first positive optical element and to diverge the laser beam;

a second positive optical element located and constructed to receive the laser beam from said negative optical element and to substantially collimate the laser beam before delivery to the working site;

and adjusting means for changing the relative distance between said negative optical element and said second positive optical element to vary the diameter of the substantially collimated light beam delivered to the working site;

and wherein said first positive optical element is a lens-grating assembly.

7. The system according to claim 6, wherein said adjusting means comprises a movable mounting for said negative optical element enabling it to be moved relative to said second positive optical element.

8. The system according to claim 6, wherein said negative optical element and said second positive optical element are optical lenses.

9. The system according to claim 6, wherein said lens-grating assembly includes a lens having a convex side facing the laser, and a diffracting grating in the opposite side facing the negative optical element.

10. The system according to claim 9, wherein said lens is of ZnSe, and said diffracting grating is etched in said opposite side of the lens.

11. The system according to claim 6, wherein there are two lasers, one delivering an invisible working beam, and the other delivering a visible aiming beam.

12. The system according to claim 11, wherein said invisible working beam is from a $CO_2$ laser, and said visible aiming beam is from an He—Ne laser.

13. The system according to claim 6, wherein said first positive optical element, negative optical element and second positive optical element are all mounted in a handpiece of a laser surgical apparatus.

\* \* \* \* \*